United States Patent [19]

Umeda et al.

[11] 4,079,426
[45] Mar. 14, 1978

[54] TAPE SPEED SWITCHING MULTIPLE TRACK TAPE RECORDER

[75] Inventors: Kenkichi Umeda; Noriaki Naito, both of Tokyo, Japan

[73] Assignee: Sony Corporation, Tokyo, Japan

[21] Appl. No.: 701,513

[22] Filed: Jul. 1, 1976

[30] Foreign Application Priority Data

Jul. 8, 1975    Japan ................................ 50-83839

[51] Int. Cl.² ........................ G11B 5/22; G11B 5/00
[52] U.S. Cl. ..................................... 360/55; 360/61
[58] Field of Search .................. 360/63, 119, 121, 61, 360/22, 55, 122, 124

[56] References Cited

U.S. PATENT DOCUMENTS

| | | | |
|---|---|---|---|
| 2,653,189 | 9/1953 | Camras | 360/119 |
| 3,060,279 | 10/1962 | Harrison | 360/119 |
| 3,426,338 | 2/1969 | Gerding | 360/61 |
| 3,576,573 | 4/1971 | Symons | 360/63 |
| 3,730,532 | 5/1973 | Miyamoto | 360/63 |
| 3,914,790 | 10/1975 | Shimada | 360/63 |

FOREIGN PATENT DOCUMENTS 4,188,913    7/1974    U.S.S.R. ................................ 360/63

*Primary Examiner*—Jay P. Lucas
*Attorney, Agent, or Firm*—Hill, Gross, Simpson, Van Santen, Steadman, Chiara & Simpson

[57] ABSTRACT

An azimuth angle other than zero can occur if magnetic tape vibrates or moves in the tape width direction during recording or playback mode and this can result in azimuth loss which is a function of the track width angle of misalignment and the wave length of the signals. The wider the tape width the greater the azimuth loss and the lower the tape transport speed the greater the azimuth loss. Thus, the present invention varies the track width and speed so as to obtain optimum reproduction fidelity by combining two or more heads to obtain the desired results.

2 Claims, 9 Drawing Figures

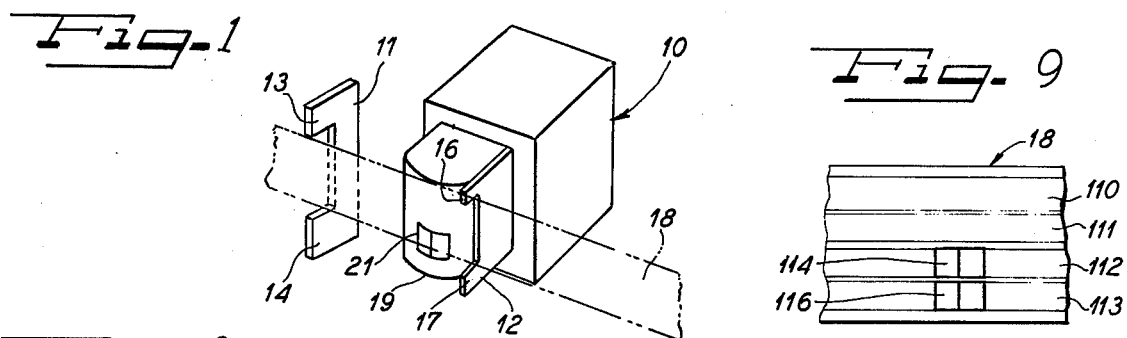
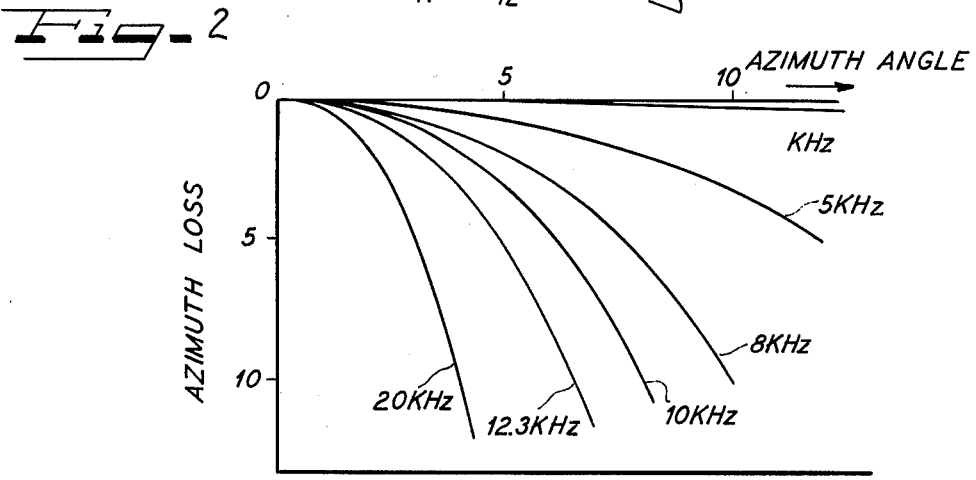
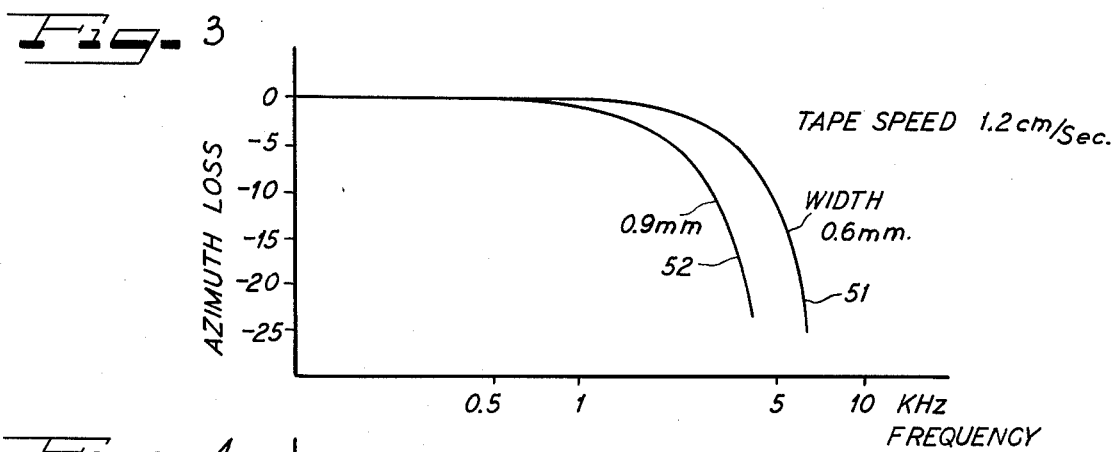
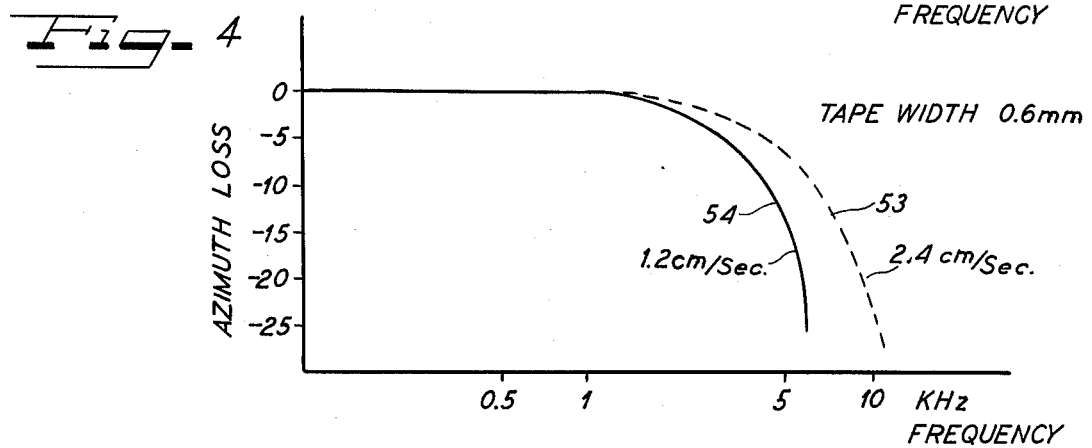

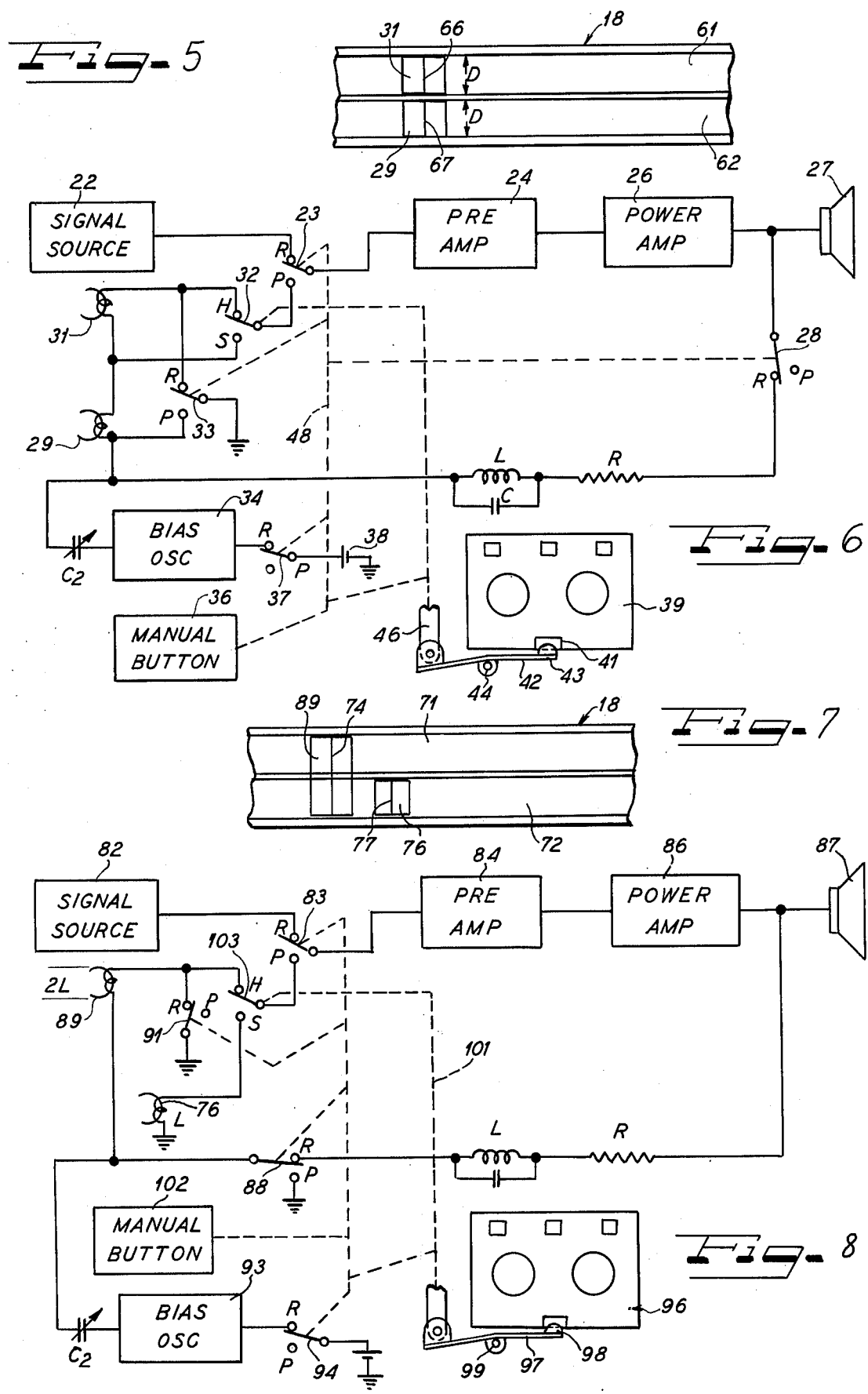

TAPE SPEED SWITCHING MULTIPLE TRACK TAPE RECORDER

BACKGROUND OF THE INVENTION

1. Field of the Invention

This invention relates in general to tape recorder and playback machines and in particular to an improved tape machine.

2. Description of the Prior Art

It is desirable in tape recorder and playback machines to have tape cassettes capable of playing substantial lengths of time which normally means that the recording and playback tape speeds should be maintained low so as to increase the length of time of the recording on the tape. However, decreasing the playback speed reduces the fidelity particularly at higher frequencies and also misalignment of the track width with the head causes azimuth loss and in the prior art the playback speed of tape machines has been limited.

SUMMARY OF THE INVENTION

It is an object of the present invention to provide a tape recorder and playback machine in which two different tape speed modes can be selected and which provides two signal recording and/or reproducing heads which correspond to different tracks on the tape such that two corresponding heads can be used to record two separate tracks on the tape and when the recorded signal is reproduced at a relatively high speed the output of both reproducing heads is used and combined. On the other hand, when the tape is transported at low speeds the reproduced signal level is not decreased because one narrow track is used.

Experiments have shown that during low speed reproduction the high frequency components of the reproduced signals are much greater attenuated than the signals over the remaining portion of the frequency range.

Thus, with the present invention, when the signal is recorded at standard speeds which is a relatively high speed two separate heads are used whereas when the signals are recorded at relatively low speeds only one head is used.

On the other hand when the tape is transported at low speeds, the reproduced signal level in the high frequency range will not be reduced because a narrow track (one track) is used.

It is to be realized, of course, that even utilizing low speed reproduction two reproducing heads can be utilized to reproduce the high level signals (big sounds) with the desired S/N ratio which can be selected by a manual control button and one reproducing head can be utilized at other times when desired.

Also, in high speed reproduction only a single head can be used. For example, if the signal is recorded by a different tape recorder which is to reproduce the recorded tape it is helpful to use only one reproducing head to compensate the high frequency signal band. Since different tape recorders may have different head azimuths which inadvertently results during the manufacture of the equipment, the reproducing head gap of the first tape recorder may not be exactly parallel to the recording head gap of the second tape recorder and, therefore, high frequency band level of the reproduced signal can be compensated by the apparatus of the invention.

The high frequency response depends upon the tape speed and the azimuth loss. At high speed reproduction, good high frequency response is obtained so two tracks is used to prevent deterioration of the signal to noise ratio.

At low speed reproduction, the main problem is poor high frequency response caused by the azimuth loss because the wider the track width the bigger the azimuth loss, so in this invention only one track is used at slow speeds to eliminate the deterioration of the high frequency response.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view of a magnetic head and tape;

FIG. 2 is a plot of azimuth angle versus azimuth's loss;

FIG. 3 is a plot of frequency versus azimuth loss;

FIG. 4 is a plot of frequency versus azimuth loss;

FIG. 5 is a plan view of magnetic tape;

FIG. 6 illustrates apparatus according to the invention;

FIG. 7 is a plan view of magnetic tape;

FIG. 8 illustrates a modification of the invention; and

FIG. 9 is a plan view of magnetic tape.

DESCRIPTION OF THE PREFERRED EMBODIMENTS

As shown in FIG. 1, tape recorders have magnetic heads 10 adjacent which are mounted tape guides 11 and 12 so as to guide the tape 18 pass the magnetic head gap 21 at the desired level. It is to be noted that the tape guide 11 has edges 13 and 14 so as to restrain the tape 18 in the desired vertical position and the tape guide 12 has portions 16 and 17 to hold the tape 18 in the proper vertical position.

However, if the width of the guides 11 and 12 are either wider or narrower than the width of the tape or if the tape is vibrated or waves as its being transported, head azimuth (head-gap alignment) in the signal recording moding may be different from that in the signal reproducing mode which results in distortion in reproduction of the signal.

If the gap of the reproducing head is not exactly parallel to the recording head gap, a loss which varies as a function of the wave length of the signal will occur. This is defined by the following equation:

$$\text{Azimuth loss, } db = 20\log \frac{\sin \frac{\pi W \cdot \tan\alpha}{\lambda}}{\frac{\pi W \cdot \tan\alpha}{\lambda}}$$

where $W$ = track width $\alpha$ = angle of misalignment $\lambda$ = wavelength

It has been discovered that for wide tracks and short wave lengths the azimuth loss can be considerable even for very small values of $\alpha$ as the signal frequency is increased.

It has been discovered that the factors which limit the high frequency response depend (1) on the track width and (2) the wave length of the recorded signal; and the following relationships exist:

1. The wider the tape track width, the greater is the increase of the azimuth loss particularly at high frequencies.
2. The lower the tape speed, the greater the azimuth loss particularly at high frequencies.

If the tape is transported at substantially low speeds, the recorded wave length will be short.

For example, if an audio signal having a constant frequency is recorded and reproduced at substantially low tape speeds the reproduced signal level in the high frequency band will be decreased because of its short wave length.

On the other hand, if narrow track width signal is selected for reducing the azimuth loss, the S/N (signal to noise) ratio of the reproduced signal will be decreased when the tape is transported at substantially high speeds.

Therefore, this invention provides an improved tape recorder especially useful for so-called Micro Tape recorders in which two tape speed modes can be selected. For this purpose, in this invention, for example, two signal recording and/or reproducing heads which correspond to different tracks are utilized.

During signal recording, the audio signal is recorded on two tracks by two corresponding heads in accordance with the selected tape speeds and this is illustrated in the embodiments of FIGS. 5 and 6 wherein two heads are used during the recording mode.

Then when the recorded signal recorded at standard speeds (2.4 cm/sec.) is reproduced at a substantial high speed two reproducing heads are used. On the other hand, when the recorded signal recorded at speeds (1.2 cm/sec.) is reproduced at low speeds only one reproduction head is used.

Thus, when the tape is transported at high speeds the S/N ratio of the reproduced signal will not be reduced because wide track (two tracks) is used.

Furthermore, when the tape is transported at low speeds the reproduced signal level in the high frequency range will not be reduced because the narrow track (one track) is utilized.

Experiments have shown that the reproduced signal having reduced high frequency response is much greater than the reduced S/N ratio over the whole frequency range during low speed reproduction. Thus, it is essential to compensate the high frequency band rather than to compensate S/N ratio during low speed reproduction.

Of course, even during low speed reproduction, the two reproducing heads can be utilized to reproduce the high level signals (big sounds) having the proper S/N ratio if necessary by selecting such mode with a manual control button, and one reproducing head can be utilized to reproduce the suitable signal in which the high frequency range signal is not reduced.

In this invention, azimuth angle is a measure of the angle between the magnetic track on the tape and the reproducing head and, thus, when there is no misalignment the azimuth angle will be zero but under nomal conditions the azimuth angle varies instantaneously.

FIG. 2 illustrates azimuth angle plotted against azimuth loss for different frequencies and it is to be noted that the loss is substantially greater for high frequencies. For example, the one kHz curve shows that there is very little azimuth loss even over relatively large azimuth angles. On the other hand, the twenty kHz curve shows a sharp and marked increase in azimuth loss as the azimuth angle varies from zero.

Conventional tape speed is 2.4 cm/sec. but it is desirable to reduce the tape speed so that longer times can be recorded on tape. Also, the head gap width can be varied.

FIG. 3 illustrates two curves. Curve 51 is a plot of frequency versus azimuth loss for tape width of 0.6 mm. Curve 52 is a curve illustrating the loss for a tape having a tape width of 0.9 mm. These curves were made at a tape speed of 1.2 cm/sec. and it is to be noted that the wider magnetic head results in substantially greater losses particularly at higher frequencies.

FIG. 4 illustrates the azimuth's loss at different frequencies for a tape having the same magnetic width of 0.6 mm. It is to be noted that tape moving at the standard speed of 2.4 cm/sec. as illustrated by curve 53 has substantially less loss than tape moving at 1.2 cm/sec. illustrated by curve 54.

These curves also illustrate that it is the higher frequencies which have the greater azimuth losses. It is seen that the azimuth loss varies as a function of the tape speed and the higher the speed of the tape which means that the wave length is long means that less loss occurs. The loss also varies as the azimuth angle as illustrated in FIG. 2 and the track width as illustrated in FIG. 3, so wide track width results in greater distortion and larger losses than narrower tape width as shown in FIG. 3 and high transport speed of the tape results in small losses whereas low transport speed result in large losses.

Thus, the inventors have discovered that if wide magnetic tape tracks are utilized then the tape should be transported at high speeds whereas narrow magnetic tape tracks can be transported at low speeds. This will give smaller loss and narrow magnetic tape track at low speed can give a result comparable to wide magnetic tape tracks transported at high speeds.

FIG. 5 illustrates tape 18 having two magnetic tracks 61 and 62 which are recorded by two magnetic heads 29 and 31 having magnetic tracks 66 and 67 of the same width D. Thus, by using two heads to simultaneously record on the magnetic head tape 18 the signal to noise ratio can be substantially increased over the entire range.

FIG. 6 illustrates recording and reproducing apparatus according to the invention wherein, for example, for reproducing, a signal source 22 supplies an output through a switch 23 in the record position to a preamplifier 24 which supplies an output to a power amplifier whose output is supplied through a switch 28 and through a resistor R and equalizing network comprising inductance L and a capacitor C to a first magnetic head 29 which has its other side connected to a second magnetic head 31. The second side of the magnetic head 31 is connected to ground through a switch 33 and, thus, when the switches are in the recording mode the heads 29 and 31 will both record on the tape 18. During recording a bias signal is applied to the magnetic heads by a battery 38 which has one terminal grounded and its other terminal connected by a switch 37 to a bias oscillator 34 which supplies an output through a variable capacitor C2 to the magnetic heads 29 and 31.

During playback the tape cassette 39 is provided with a sensing gap 41 in which a feeler pawl 42 is received and has an end 43 which senses the speed at which the tape was recorded by sensing the opening 41. The pawl 42 is pivotally supported by a shaft 44 and is linked through mechanical linkage 46 to move a switch 32 between high speeds and slow speed positions.

The manual button 36 moves the switches 23, 33, 37 and 28 and during the playback mode if playback occurs during high speed operation the heads 29 and 31 both reproduce the signals on tracks 61 and 62 of the tape and supply them through switch 32 and switch 23 to the preamp 24 and power amplifier 26 to the loud speaker 27. The switch 28 is opened at this time. If the tape is to be driven at slow speed the switch 32 is moved to the S position and only the output of magnetic head 29 is supplied through switch 32 to the speaker 27 through preamp 24 and the power amplifier 26.

Thus, for example, low speed could be used for dictating and one head with a narrow magnetic track does not substantially reduce the low frequency signals and sound recording at slow speeds is satisfactory for speaking but does not give a high fidelity for high frequencies, as for example, music.

Thus, in operation the apparatus illustrated in FIGS. 5 and 6 allow recording and reproduction to occur with either two or one head and it is to be noted that the width of the heads 29 and 31 are D as illustrated in FIG. 5.

Another embodiment of the invention is illustrated in FIGS. 7 and 8 wherein the magnetic tape 8 can have a wide track recorded on it in track 71 and 72 by a head 89 having a wide magnetic track 74. Head 76 having a narrow track 77 only half as wide as the track 74 may be used for reproduction in certain modes.

The apparatus illustrated in FIG. 8 is used with the tape of FIG. 7 wherein a signal source 82 supplies an input through switch 83 in the recording mode to a preamplifier 84 which supplies an output to a power amplifier 86 and through a resistor R and equalizing network comprising the inductor L and capacitor C through switch 88 to the head 89 which has a wide magnetic track 2L. The other side of the head 89 is connected to ground through switch 91.

During playback with high speed movement of the tape, the switch 103 is in the high speed position and the head 89 reproduces a signal from the tape 18 and supplies it through switch 103 and switch 83 to the preamplifier 84 and power amplifier 86 to the speaker 87. During slow speed reproduction, the switch 103 disconnects the output of the wide head 89 from the preamp 84 and supplies the narrow track head 76 to the input of the preamplifier 84 so as to reproduce the track 72 at the output of the speaker 87.

FIG. 9 illustrates tape 18 which has two upper tracks 110 and 111 which are used for the reverse direction play of the tape and two tracks 112 and 113 which are used for forward direction of the tape. In other words, a pair of heads 114 and 116 can be used with tracks 112 and 113 such that both heads 114 and 116 are used for high speed and either head 114 and 116 can be used for low speed.

Thus, it is seen that the basic principles of the invention allows improved recording and reproduction by varying the magnetic head tape gap width and tape speed so as to obtain optimum reproduction.

Although the invention has been described with respect to preferred embodiments it is not to be so limited as changes and modifications may be made which are within the full intended scope as defined by the appended claims.

We claim as our invention:

1. A signal recording and/or reproducing apparatus comprising, magnetic signal-recording means including a pair of magnetic heads of the same width for recording at different speed a signal on one or two parallel recording tracks on a magnetic tape with said recording being on one track at slow tape speeds and on two tracks at high tape speeds, magnetic signal-reproducing means for selectively reproducing said recorded signals from either two or one of said two parallel recording tracks including two magnetic heads of the same width with said recorded signals being reproduced from said one and two of the recorded tracks at relatively high tape speeds, and said recorded signals being reproduced from said one of said two tracks at relatively low tape speeds, and speed switching means connected to said reproducing means to switch it to one track at low speeds and to said one and two tracks at high speeds.

2. A signal recording and/or reproducing apparatus comprising, magnetic signal-recording means including a magnetic head of wide width for recording a signal on two parallel magnetic tracks at high and low tape speeds, magnetic signal reproducing means with a magnetic head of wide width for reproducing at high speeds signals from said two parallel magnetic tracks and a magnetic head of narrow width for reproducing at low speeds signals from one of said tracks, and speed switching means connected to said reproducing means to connect it to said magnetic head of wide width for high speeds and to said head of narrow width for low speeds.

* * * * *